(12) United States Patent
Audebert et al.

(10) Patent No.: US 7,225,465 B2
(45) Date of Patent: *May 29, 2007

(54) METHOD AND SYSTEM FOR REMOTE MANAGEMENT OF PERSONAL SECURITY DEVICES

(75) Inventors: Yves Louis Gabriel Audebert, Los Gatos, CA (US); Olivier Clemot, Fremont, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 862 days.

This patent is subject to a terminal disclaimer.

(21) Appl. No.: 09/844,272

(22) Filed: Apr. 30, 2001

(65) Prior Publication Data

US 2002/0162022 A1  Oct. 31, 2002

(51) Int. Cl.
*H04L 9/00* (2006.01)
*H04L 9/32* (2006.01)

(52) U.S. Cl. ............... 726/20; 726/9; 713/155; 380/282

(58) Field of Classification Search ........... 713/200, 713/201, 150; 726/9, 20; 729/20; 707/203; 709/217; 380/282; 705/41, 66; 307/10.5
See application file for complete search history.

(56) References Cited

U.S. PATENT DOCUMENTS

| | | | |
|---|---|---|---|
| 5,276,735 A * | 1/1994 | Boebert et al. ........ | 713/167 |
| 5,455,863 A | 10/1995 | Brown et al. | |
| 5,499,297 A * | 3/1996 | Boebert ............ | 713/159 |
| 5,761,309 A * | 6/1998 | Ohashi et al. ........ | 713/156 |
| 5,778,071 A | 7/1998 | Caputo et al. | |
| 5,917,168 A * | 6/1999 | Nakamura et al. ........ | 235/379 |
| 5,944,821 A | 8/1999 | Angelo | |
| 5,991,407 A | 11/1999 | Murto | |
| 6,005,942 A | 12/1999 | Chan et al. | |
| 6,018,779 A | 1/2000 | Blumenau | |
| 6,101,254 A | 8/2000 | Thiriet | |
| 6,101,255 A * | 8/2000 | Harrison et al. ........ | 380/52 |
| 6,105,008 A | 8/2000 | Davis et al. | |
| 6,128,338 A | 10/2000 | Behaghel et al. | |
| 6,131,811 A | 10/2000 | Gangi | |
| 6,144,671 A | 11/2000 | Perinpanathan et al. | |
| 6,181,735 B1 | 1/2001 | Sarat | |
| 6,192,473 B1 * | 2/2001 | Ryan et al. .......... | 713/168 |
| 6,195,700 B1 | 2/2001 | Bender et al. | |

(Continued)

FOREIGN PATENT DOCUMENTS

DE  19522527  1/1997

(Continued)

OTHER PUBLICATIONS

Global Platform, Open Platform, Terminal Specification, Version 1.5, Nov. 1999.

(Continued)

*Primary Examiner*—Kim Vu
*Assistant Examiner*—Linh L D Son
(74) *Attorney, Agent, or Firm*—Stevens, Davis, Miller & Mosher, LLP (57) ABSTRACT

A method and system for installing, activating and customizing proprietary information contained within the secure domain of a personal security device such as a smart card over a network using a communications pipe.

23 Claims, 4 Drawing Sheets

U.S. PATENT DOCUMENTS

| | | | |
|---|---|---|---|
| 6,233,683 B1 | 5/2001 | Chan et al. | |
| 6,279,047 B1 | 8/2001 | Bublitz et al. | |
| 6,385,729 B1* | 5/2002 | DiGiorgio et al. | 726/9 |
| 6,434,238 B1 | 8/2002 | Chaum et al. | |
| 6,481,632 B2* | 11/2002 | Wentker et al. | 235/492 |
| 6,575,360 B1 | 6/2003 | Hagn | |
| 6,602,469 B1* | 8/2003 | Maus et al. | 422/68.1 |
| 6,694,436 B1* | 2/2004 | Audebert | 713/200 |
| 6,718,314 B2 | 4/2004 | Chaum et al. | |
| 6,751,671 B1* | 6/2004 | Urien | 709/229 |
| 6,807,561 B2 | 10/2004 | Lagosanto et al. | |
| 6,892,301 B1 | 5/2005 | Hansmann et al. | |
| 6,944,650 B1* | 9/2005 | Urien | 709/217 |
| 6,993,131 B1* | 1/2006 | Meyers | 380/201 |
| 7,028,187 B1* | 4/2006 | Rosen | 713/175 |
| 7,046,810 B2* | 5/2006 | Takada et al. | 380/284 |
| 2001/0039587 A1* | 11/2001 | Uhler et al. | 709/229 |
| 2001/0045451 A1* | 11/2001 | Tan et al. | 235/375 |
| 2002/0025046 A1 | 2/2002 | Lin | |
| 2002/0040936 A1 | 4/2002 | Wentker et al. | |

FOREIGN PATENT DOCUMENTS

| | | |
|---|---|---|
| EP | 0911772 | 4/1999 |
| EP | 0923211 | 6/1999 |
| WO | 9852161 | 11/1998 |
| WO | 9962037 | 12/1999 |
| WO | 9962210 | 12/1999 |
| WO | 0116900 | 3/2001 |
| WO | 0122373 | 3/2001 |
| WO | 0159730 | 8/2001 |

OTHER PUBLICATIONS

Global Platform, Open Platform Terminal Framework, API Version 1.5.4, Jul. 20, 2000.

Global Platform, Multi Application- Smart Card Management Systems, Global Platform Functional Requirements, Version 3.3, Nov. 2000.

ISO/IEC 7816-4: 1995/Amd.1:1997(E) Information technology, Identification cards Integrated circuit(s) cards with contacts, Part 4: Interindustry commands for interchange, Amendment 1.

ISO/IEC 7816-4: 1995(E) Information technology, Identification cards, Integrated circuit(s) cards with contacts, Part 4: Interindustry commands for interchange.

ISO/IEC 7816-5: 1994/Amd. 1: 1996(E) Identification cards, Integrated circuit(s) cards with contacts, Part 5: Numbering system and registration procedure for application identifiers, Amendment 1.

ISO/IEC 7816-5: 1994(E) Identification cards, Integrated circuit(s) cards with contact, Part 5: Numbering system and registration procedure for application identifiers.

Java Card 2.1 Application Program Interface Sun Microsystems, inc. Final Revision 1.1, Jun. 7, 1999.

Chen, Zhiqun, "How to write a Java Card applet: a Developer's Guide", Javaworld, Jul. 1999.

Chen, Zhiqun et al., "Understanding Java Card 2.0," Javaworld, Mar. 1998.

Posey, Brien, "Using Smart Cards with With Windows 2000," TechCrawler.com, Sep. 28, 2000.

International Search Report dated Aug. 23, 2002.

N. Itoi, et al., "Secure Internet Smartcards," CITI Technical Report 00-6 www.citi.umich.edu/projects/smartcard/, Center for Information Technology Integration, University of Michigan, pp. 1-12, Aug. 24, 2000.

Chen, Zhiqun, "How to write a Java Card applet: a Developer's Guide", Javaword, Jul. 1999.

T. Ebringer, et al.; "Parasitic Authentication To Protect Your E-Wallet," Computer, IEEE Computer Society, Long Beach. CA, US, vol. 33, No. 10, Oct. 1, 2000, XP001001747, ISBN: 0018-9162, pp. 54-60.

International Search Report dated Aug. 27, 2002.

International Search Report Sep. 3, 2002.

P. Trommler, et al.: "Smart Cards and the OpenCard Framework," Java World, Jan. 1998, XP002173639, pp. 1-12.

T. Ebringer, et al.; "Parasitic Authentication To Protect Your E-Wallet," Computer, IEEE Computer Society, Long Beach, CA, US, US, vol. 33, No. 10, Oct. 1, 2000, XP001001747, ISBN: 0018-9162, pp. 54-60.

ISO/IEC 7816-4: 1995/Amd.1:1997(E) Information technology-Identification card-Integrated circuit(s) cards with contacts, Part 4: interindustry commands for interchange, Amendment 1, pp. 1-5, Dec. 15, 1997.

ISO/IEC 7816-4: 1995(E) Information technology-Identification cards-Integrated circuit(s) cards with contacts, Part 4: Interindustry commands for interchange, pp. 1-46, Sep. 1, 1995.

U.S. Appl. No. 09/844,246 entitled "Method And System For Establishing A Remote Connection To A Personal Security Device", filed on Apr. 30, 2001 by Y. Audebert, et al.

U.S. Appl. No. 09/844,439 entitled "Method And System For Authentication Through A Communications Pipe", filed Apr. 30, 2001 by Y. Audebert, et al.

Europeans Telecommunications Standards Institute: "Digital Cellular Telecommunications System (Phase 2+) (GSM); Universal Mobile telecommunications System (UMTS): Security Mechanisms for the (U) SIM application toolkit; Stage 2; (3GPP TS 23.048 version 4.1.0 Release 4)" ETSI TS 123 048 V4.1.0, Sep. 2001, pp. 1-35, XP002237189 ETSI Technical Specification.

"Digital Cellular Telecommunications System (Phase 2+) (GSM); Specification of the SIM Application Toolkit for the Subscriber Identity Module—Mobile Equipment (SIM—ME) Interface (GSM 11.14 version 8.3.0 Release 1999)" ETSI TS 101 267 v8.3.0, XX, XX, Aug. 2000, pp. 1-69, 114, 115, XP002222021.

U.S. Appl. No. 10/476,329.

U.S. Appl. No. 09/844,246.

U.S. Appl. No. 09/844,439.

U.S. Appl. No. 10/476,416.

U.S. Appl. No. 10/476,316.

Office Action dated Jan. 17, 2006 in U.S. Appl. No. 10/085,127.

* cited by examiner

METHOD AND SYSTEM FOR REMOTE MANAGEMENT OF PERSONAL SECURITY DEVICES

CROSS-REFERENCE TO RELATED APPLICATIONS

The present application is related to co-pending U.S. patent applications Ser. No. 09/844,246 entitled (OCL-1) "Method and Systems for Establishing a Remote Connection To a Personal Security Device" Ser. No. 09/844,439 and (OCL-2), "Method and System for Authentication Through a Communications Pipe," both filed on Apr. 30, 2001, and assigned to the assignee present invention. Applicant hereby incorporates by reference the above-mentioned co-pending applications.

FIELD OF INVENTION

The present invention relates to a data processing method for remote activation of personal security devices over a network for purposes of obtaining services or data from one or more remote computer systems. More particularly, the invention relates to a secure single-step method of activating and managing a personal security device through a communications pipe.

BACKGROUND OF INVENTION

The current art involving the management of personal security devices (PSD), for example, smart cards, requires a multi-step process where all the information necessary to use a personal security device is loaded into a PSD prior to distribution, including an initial personal identification number or PIN. The PSD is then sent to the end user followed by a separate letter containing the initial PIN which the user must enter the first time the PSD is used. Another current alternative, affixes an adhesive label containing a telephone number on a PSD prior to issuance. This label provides instructions for the end user to telephone a call center to activate the PSD before the device can be used.

The latter and former methods constitute multi-step processes, which adds considerably to the initial distribution and subsequent management costs of the PSDs. For example, in issuing smart cards, additional equipment, maintenance, labor and operating costs are required to generate either the separate mailings containing an initial PIN, or to generate adhesive labels to be placed on the smart cards and to operate the call centers which activate the cards.

Another major drawback of the current art concerns the lack of ability to manage information contained within the PSD after the device is issued. Currently, PSDs, which require changes, are either sent back to a central location or simply discarded and replaced with a new device. Both processes are time consuming and costly.

SUMMARY OF INVENTION

This invention provides a post issuance method of securely downloading and managing information inside the protected domain of a personal security device. This improvement over the current art utilizes a communications pipe as described in patent application OCL-1, "Method and System for Establishing a Remote Connection To a Personal Security Device," which allows downloading of information into a blank personal security device and subsequently managing that information. For purposes of this invention, a blank PSD lacks proprietary algorithms and/or data but does contain an embedded runtime environment and optionally a unique identifier code.

In this invention, a communications pipe is established between a PSD via a client over a network to a remote computer system. This arrangement allows either the remote computer system maintaining the communications pipe or another remote computer system to download proprietary information such as authentication algorithms, cryptographic keys, credentials or certificates directly into a PSD connected to a local client through the communications pipe without disclosing proprietary information to the local client.

A major advantage of this method is it allows blank PSDs to be issued in bulk and activated at a future date without risk of compromise. Since no proprietary data is included in a bulk distribution, the PSDs are not usable to gain access to secure functions or data.

An example process by which a blank PSD becomes activated is as follows; an end user, who has previously received a blank PSD, connects the PSD to a local client and accesses a predetermined site over a network located on a remote computer system. The remote computer system may optionally perform end user authentication by some predetermined method such as prompting for a social security number, static PIN, mother's maiden name, etc. Alternatively, authentication may be implied using a unique identifier contained within the PSD.

Once the end user is properly authenticated or valid PSD connected, a remote computer system forms a communications pipe as described in co-pending patent application OCL-1, "Method and System for Establishing a Remote Connection to a Personal Security Device," and downloads, or causes another remote computer system to download, the necessary information through the communications pipe and into the PSD. The PSD may become activated upon completion of the process or as an additional security measure, the end user is prompted to devise and enter a unique PIN code to further protect access to the PSD.

In a second embodiment of this invention, a means to manage (e.g. upgrade, change, delete) PSD algorithms and data is facilitated by remotely gaining access to the devices and then downloading the changes directly into the PSDs, again without leaving proprietary information on the clients. Any changes necessary to proprietary information may be performed entirely within the secure domain of the PSD.

In both embodiments of the invention, all transactions occur within the secure domain of a PSD and a secure remote computer system, thus providing end-to-end security. When employed with the secure hub described in patent application OCL-2, "Method and System for Authentication Through a Communications Pipe," this improvement provides a centralized depository for tracking of PSD changes and greatly simplifies the management of large numbers of PSDs.

DETAILED DESCRIPTION OF PREFERRED EMBODIMENT

The need for secure network communications is paramount for sensitive business and government transactions. This invention provides an improvement over the current art by allowing issuance of generic personal security devices, which can be activated and customized at a later date.

Figure 1A:
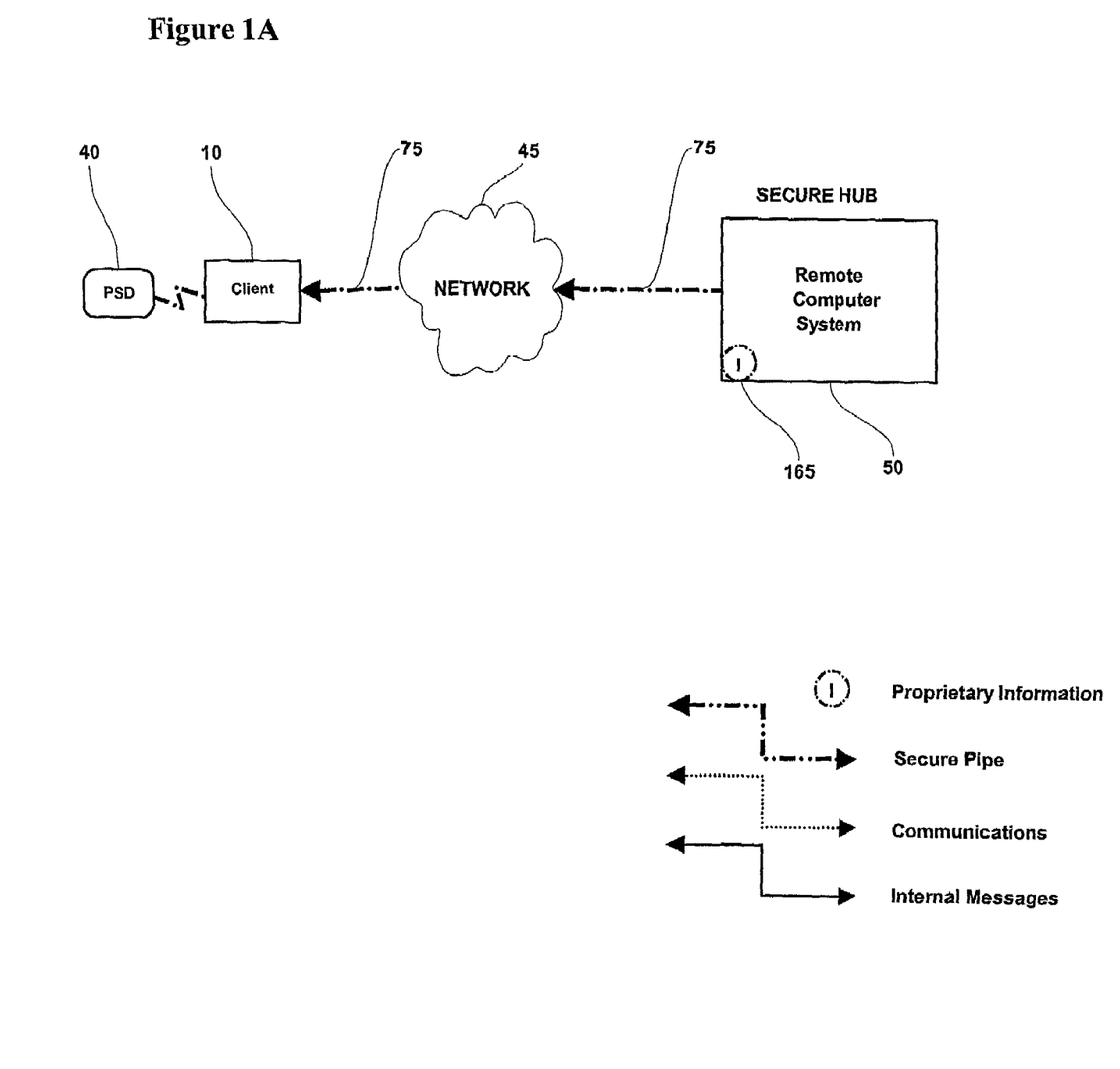
FIG. 1A—is a general system block diagram for implementing present invention using a first remote computer system.
Figure 1B:
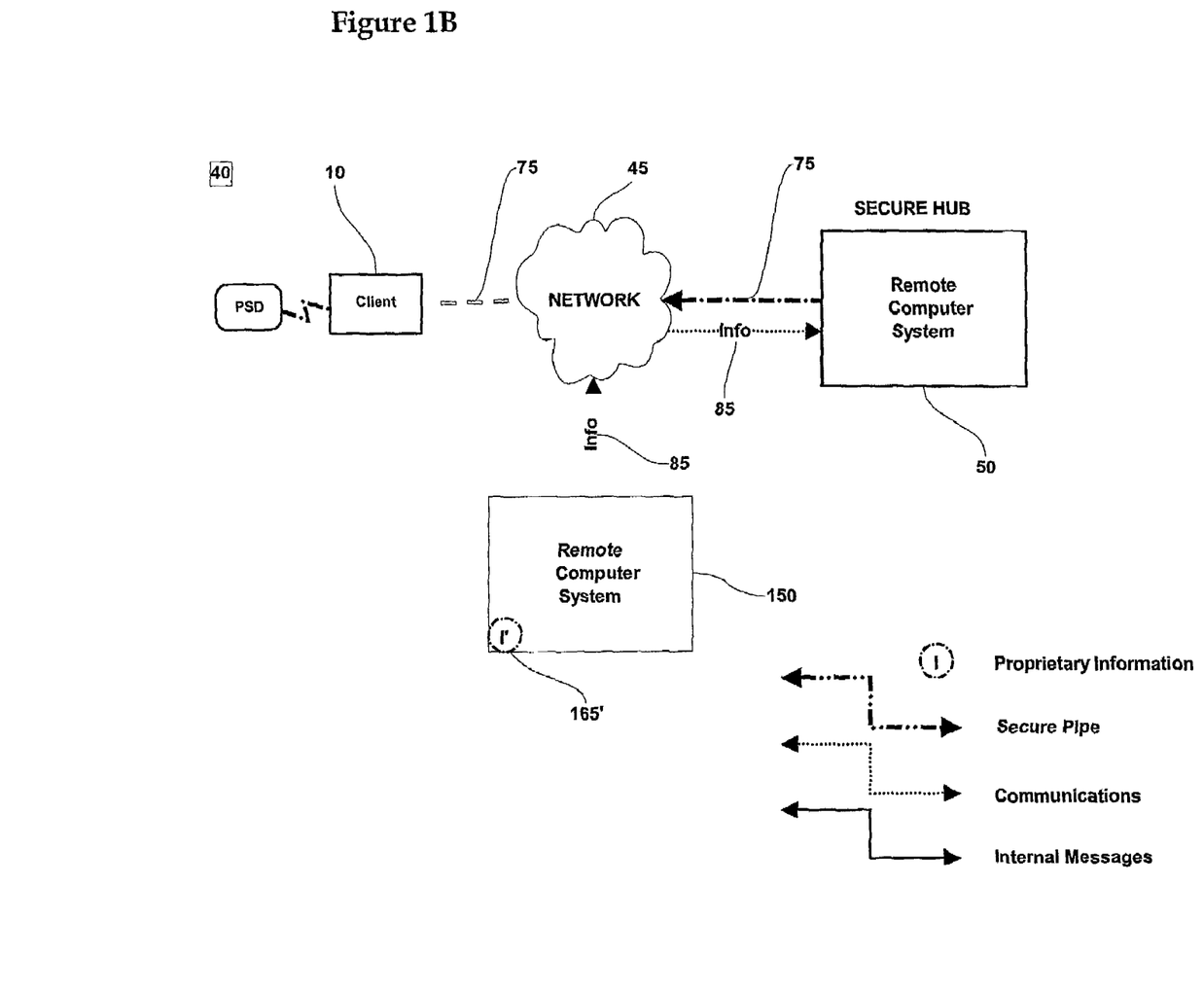
FIG. 1B—is a general system block diagram for implementing present invention using a subsequent remote computer system FIG. 2—is a detailed block diagram illustrating the direct transfer of proprietary information to a PSD.
Figure 2:
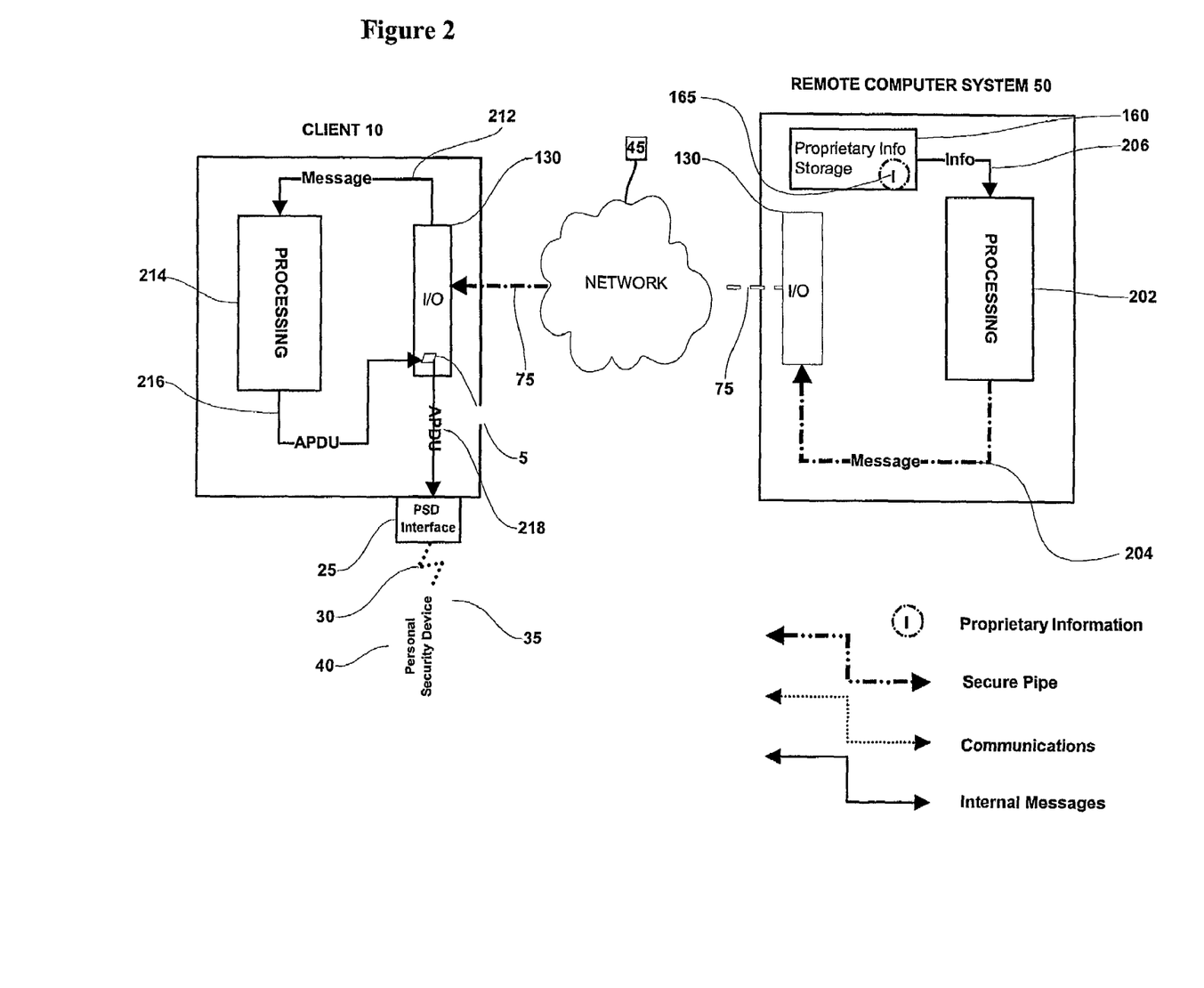
Figure 3:
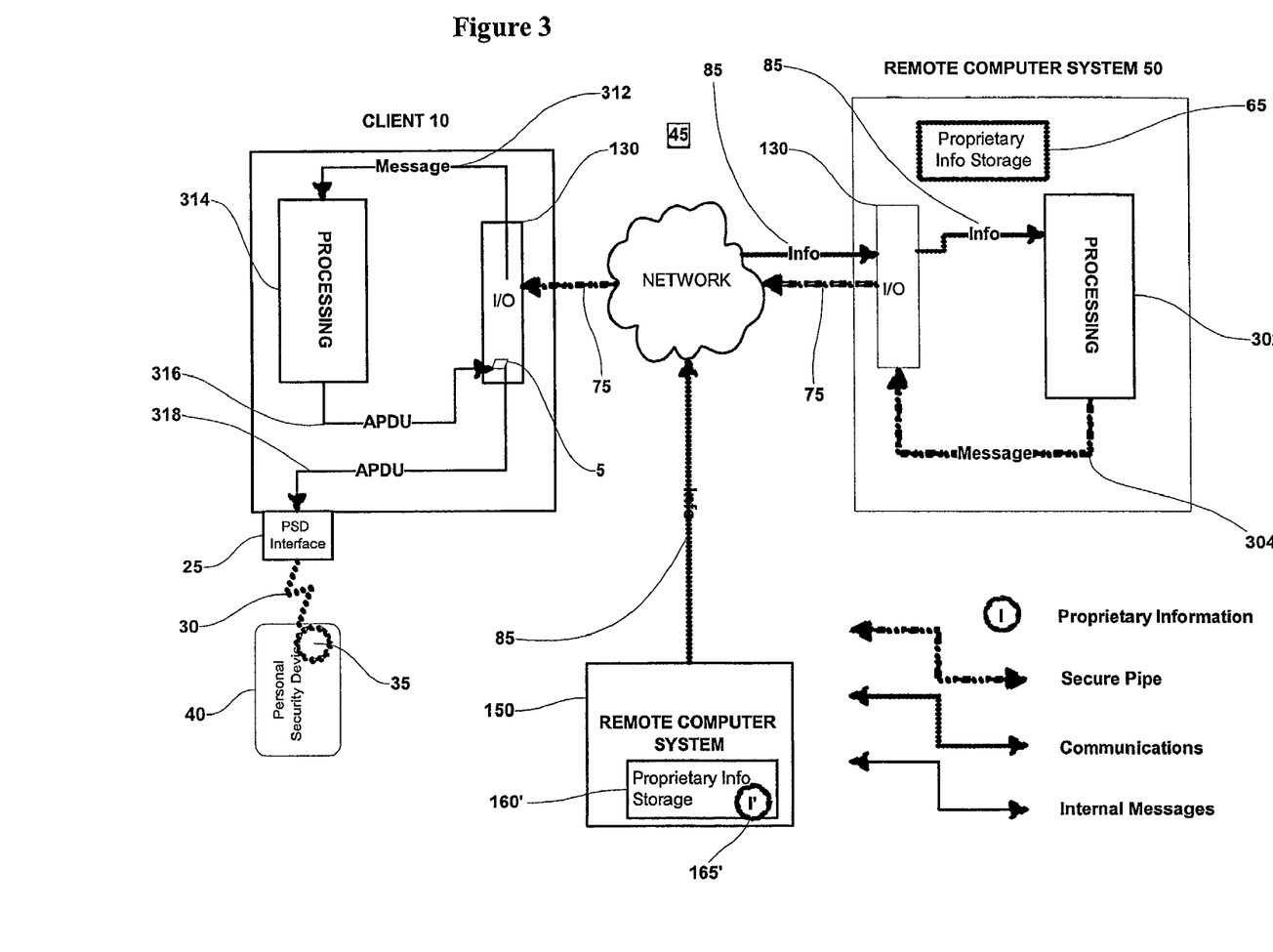
FIG. 3—is a detailed block diagram illustrating the remote transfer of proprietary information to a PSD.

The steps involved in activating a PSD and performing subsequent information management through a communications pipe are shown in FIGS. 1 through 3. For purposes of demonstration, it should be assumed that any local authentications between the end user, client and local network domain have already been accomplished. In the preferred embodiment of the invention a secure communications protocol is employed over the network between the client and one or more remote computer systems. It is understood to one skilled in the art, that either embodiment of the invention will work with or without the use of secure communications protocols.

Referring now to FIG. 1A, a generalized system block diagram of the invention where Client 10 and a connected Personal Security Device 40 are connected over a network 45 with a remote computer system 50 using a communications pipe 75 as described in co-pending patent application OCL-1, "Method and System for Establishing a Remote Connection to a Personal Security Device." A remote computer system 50 maintains the communications pipe 75 and is available to transfer proprietary information "I" 165 through the communications pipe 75 and into the PSD 40.

In FIG. 1B, a second embodiment of the invention is depicted where a first remote computer system 50 acting as a secure hub as described in co-pending patent application OCL-2, "Method and System for Authentication Through a Communications Pipe," provides a mechanism for a subsequent remote computer system 150 connected 85 to a network 45 to transfer proprietary information "I'" 165' into a PSD 40. In this embodiment of the invention, proprietary information 165' is received and processed by a first remote computer system 50. The proprietary information 165' is then sent by the first remote computer system 50, through the communications pipe 75 and into the PSD 40.

The network 45 may be a common network as in a virtual private networking arrangement or separate networks such as private intranet and public internet arrangements. No limitation is intended in the number of PSDs 40 and clients 10 forming communications pipes 75 with one or more remote computer systems 50, 150; nor should any limitation on the number of remote computer systems 50, 150 available for transferring proprietary information 165, 165' be construed from any of the depictions shown herein.

End user authentication is optional for activating blank PSDs or for deactivating PSDs already in use. In instances where access to a previously personalized PSD is desired, authentication transactions may be required as described in co-pending patent application OCL-2, "Method and System for Authentication Through a Communications Pipe," to facilitate secure access to the PSD. Once the authentication process has been accomplished, changes to proprietary information contained within the secure domain of the PSD are accomplished using the equivalent methodology described for blank card activation.

Proprietary information 165, 165' for injection into a PSD may originate on a remote computer system 50 supporting a communications pipe, other remote computer systems 150 or using any combination of remote computer systems.

Referring to FIG. 2, this drawing illustrates the transfer of proprietary information from a storage location over a network into a PSD using the remote computer system supporting the communications pipe. This drawing is applicable for either activating a blank PSD or changing information in an active PSD subsequent to authentication. In this embodiment of the invention, the proprietary information 165 is called from its storage location 160 within the remote computer system 50 or another remote computer system, which is local to, and communicating with, the remote computer system 50 maintaining the communications pipe 75.

After retrieval, the proprietary information 165 is sent 206 for processing into APDU format and encapsulation into the proper communications messaging format 204 as described in co-pending patent application OCL-1, "Method and System for Establishing a Remote Connection To a Personal Security Device." After processing, the communications message 204 is sent through the network interface 130, into the communications pipe 75 over network 45 and received by the client 10 via a complementary network interface 130.

The incoming communications messages are sent 212 for processing where the APDU formatted information is separated as described in co-pending patent application OCL-1, "Method and System for Establishing a Remote Connection To a Personal Security Device." The separated APDUs are then routed 216 through the hardware device port 5 and into 218 the PSD device interface 25. The incoming APDUs are then routed 30 into the secure domain 35 of the PSD 40 where the information is processed and stored by at least one embedded algorithm.

For newly issued PSDs lacking proprietary information, the embedded algorithm is installed by the PSD issuer and functions to manage the initial installation of proprietary information. For PSDs already containing proprietary information, the algorithm may be the same or a different algorithm, which may include cryptographic capabilities.

Referring to FIG. 3, this drawing illustrates the transfer of proprietary information from a remote storage location 160' over a network 45 and injection into a PSD 40 using a plurality of remote computer systems 50, 150. This embodiment of the invention involves retrieving proprietary information 165' from one or more 150 remote computer systems, sending 85 the proprietary information over a network 45 where the proprietary information is received and processed by a first remote computer system 50 which is supporting a communications pipe 75 and injected into the secure domain 35 of the PSD 40.

This embodiment of the invention is applicable for either activating a blank PSD or changing information in an active PSD subsequent to authentication. In instances where authentication is required, the remote computer system supporting the communications pipe may operate as a secure hub as described in co-pending patent application OCL-2, "Method and System for Authentication Through a Communications Pipe."

In this embodiment of the invention, the proprietary information 160' is called from a storage location inside a remote computer system 150 or another remote computer system, which is local to, and communicating with, the called remote computer system 150. The proprietary information "I'" 165' is retrieved and sent 85 over the network 45 to the remote computer system 50 supporting the communications pipe 75 with the designated PSD 40.

Remote computer system 50 receives the proprietary information through the network interface 130 and routes the incoming proprietary information 165' for processing it 302 into APDU format and encapsulation into the proper communications messaging format 304 as described in co-pending patent application OCL-1, "Method and System for Establishing a Remote Connection To a Personal Security Device." After processing, the communications message 304 is sent through the network interface 130, into the communications pipe 75 over network 45 and received by the client 10 via a complementary network interface 130.

The incoming communications messages are sent 312 for processing in 314 where the APDU formatted information is separated as described in co-pending patent application OCL-1, "Method and System for Establishing a Remote Connection To a Personal Security Device." The separated APDUs are then routed 316 through the hardware device port 5 and into 318 the PSD device interface 25. The incoming APDUs are then routed 30 into the secure domain 35 of the PSD 40 where the information is processed and stored by at least one embedded algorithm.

As previously described, for newly issued PSDs lacking proprietary information, the embedded algorithm is installed by the PSD issuer and functions to manage the initial installation of proprietary information. For PSDs already containing proprietary information, the algorithm may be the same or a different algorithm, which may include cryptographic capabilities.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. Other variations and embodiments are possible in light of above teachings, and it is not intended that this Detailed Description limit the scope of invention, but rather by the claims following herein.

What is claimed:

1. A system for transferring proprietary information through a communications pipe established between at least a first remote computer system and at least a personal security device using a local client as a communications host for said personal security device, said system comprising:
   at least one network, wherein said network includes means for functionally connecting at least one local client with said at least one first remote computer system;
   said local client further comprising means for functionally connecting to a personal security device Interface and said network, means for functionally communicating over said network with said remote computer system and means for establishing a communications pipe, said means for establishing a communications pipe comprising:
      client communications means for transmitting and receiving message packets over said network using a packet based communications protocol, and for transmitting and receiving application protocol data units (APDUs) through said personal security device Interface;
      first client data processing means for receiving incoming message packets from said remote computer system using said client communications means, separating encapsulated APDUs from said incoming message packets thus generating desencapsulated APDUs and routing said desencapsulated APDUs to said personal security device through said personal security device Interface independently of the origin and integrity of said incoming message packets; and
      second client data processing means for receiving incoming APDUs from said personal security device interface, encapsulating said incoming APDUs into outgoing message packets and routing said outgoing message packets to said remote computer system through said client communications means;
   said at least one personal security device further comprising at least one embedded personal security device application, a microprocessor, a runtime environment and at least one internal memory location, wherein said embedded application receives proprietary information through said established communications pipe and stores said information in said internal memory location and wherein said personal security device is functionally connected to said client and is functionally communicating with said client and said first remote computer system through said established communications pipe; and
   said at least one first remote computer system further comprising means for transferring said proprietary information from a storage location through said established communications pipe, wherein said first remote computer system is functionally connected to said network and is functionally communicating with said client and said personal security device through said established communications pipe.

2. The system according to claim 1, further comprising cryptography means for decrypting encrypted said incoming proprietary information and encrypting outgoing responses communicated through said established communications pipe.

3. The system according to claim 1, wherein said memory location is an open location.

4. The system according to claim 1, wherein said memory location is a secure location.

5. The system according to claim 1, further comprising receiving, processing and routing means for transferring said proprietary information received over said network from at least one subsequent remote computer system through said established communications pipe to said personal security device.

6. The system according to claim 1, wherein said storage location is local to said first remote computer system.

7. The system according to claim 1, wherein said storage location is local to at least one subsequent remote computer system.

8. The system according to claim 1, further comprising means for functionally connecting said first remote computer system with at least one subsequent remote computer system.

9. The system according to claim 8, wherein said subsequent remote computer system is functionally connected to said network and is functionally communicating with said first remote computer system using said network.

10. The system according to claim 1, wherein said established communications pipe employs an open communications protocol.

11. The system according to claim 1, wherein said established communications pipe employs a secure communications protocol.

12. A method for transferring proprietary information through a communications pipe between at least a first remote computer system and at least a personal security device using a local client as a communications host for said personal security device, said method comprising:

establishing a communications pipe between said personal security device and said first remote computer system over at least one network and using said client as a communications host for said personal security device, wherein said client and said remote computer system are in functional communication using a packet based communications protocol over said network, and wherein transmitting a message from said remote computer system to said personal security device through said communications pipe comprises:

generating a message on said remote computer system, wherein said message is in a nonnative protocol for communicating with said personal security device and said message is generated by an API Level Program, converting on said remote computer system said message from said non-native protocol into an application protocol data unit (APDU) format message using a first server data processing means, encapsulating on said remote computer system said APDU format message into said packet based communications protocol producing an encapsulated message, using a second server data processing means, transmitting said encapsulated message over said network using said packet based communications protocol, receiving by said client said encapsulated message sent over said network, processing said encapsulated message using a first data processing means to separate said APDU format message from said encapsulated message, and routing on said client said APDU format message through a hardware device port assigned to a personal security device Interface, independently of the origin and integrity of said encapsulated message, wherein said personal security device Interface is in processing communication with said personal security device;

retrieving said proprietary information from a storage location by said first remote computer system, processing said proprietary information by said first remote computer system, transmitting as a message said proprietary information through said established communications pipe to said personal security device, receiving said proprietary information through said established communications pipe from said first remote computer system by said personal security device, and storing said proprietary information in a memory location inside said personal security device, using at least one embedded internal algorithm.

13. The method according to claim 12, further comprising retrieving said proprietary information from a local storage location.

14. The method according to claim 12, further comprising retrieving said proprietary information from a remote storage location.

15. The method according to claim 12, further comprising establishing said communications pipe using an open communications protocol.

16. The method according to claim 12, further comprising establishing said communications pipe using a secure communications protocol.

17. A method for transferring proprietary information through a communications pipe between at least a first remote computer system and at least a personal security device using a local client as a communications host for said personal security device, said method comprising:

establishing a communications pipe between said personal security device and said first remote computer system over at least one first network and using said client as a communications host for said personal security device, wherein said client and said remote computer system are in functional communication using a packet based communications protocol over said network, and wherein transmitting a message from said remote computer system to said personal security device through said established communications pipe comprises:

generating a message on said remote computer system, wherein said message is in a nonnative protocol for communicating with said personal security device and said message is generated by an API Level Program, converting on said remote computer system said message from said non-native protocol into an application protocol data unit (APDU) format message using a first server data processing means, encapsulating on said remote computer system said APDU format message into said packet based communications protocol producing an encapsulated message, using a second server data processing means, transmitting said encapsulated message over said network using said packet based communications protocol, receiving by said client said encapsulated message sent over said network, processing said encapsulated message using a first data processing means to separate said APDU format message from said encapsulated message, and routing on said client said APDU format message through a hardware device port assigned to a personal security device Interface independently of the origin and integrity of said encapsulated message, wherein said personal security device Interface is in processing communication with said personal security device;

establishing communications between said first remote computer system and a subsequent remote computer system over at least one second network, transmitting said proprietary information over said at least one second network by said at least one subsequent remote computer system, receiving said proprietary information sent over said at least one second network by said at least one subsequent remote computer system, processing said proprietary information by said first remote computer system, transmitting as a message said proprietary information through said established communications pipe to said personal security device, receiving said proprietary information through said established communications pipe from said first remote computer system by said personal security device, and storing said proprietary information in a memory location inside said personal security device, using at least one embedded internal algorithm.

18. The method according to claim 17, further comprising establishing said communications pipe using an open communications protocol.

19. The method according to claim 17, further comprising establishing said communications pipe using a secure communications protocol.

20. The method according to claim 17, further comprising establishing said communications using an open communications protocol.

21. The method according to claim 17, further comprising establishing said communications using a secure communications protocol.

22. The method according to claim 12 or claim 17, further comprising;
  encrypting said proprietary information by said first remote computer system prior to transmitting said proprietary information through said established communications pipe, and
  decrypting said encrypted proprietary information after receiving said proprietary information through said established communications pipe by said personal security device.

23. The method according to claim 22 further comprising;
  encrypting said proprietary information by said subsequent remote computer system prior to transmitting said proprietary information over said communications network, and
  decrypting said encrypted proprietary information after receiving said proprietary information over said network by said first remote computer system.

\* \* \* \* \*

UNITED STATES PATENT AND TRADEMARK OFFICE
CERTIFICATE OF CORRECTION

| | | |
|---|---|---|
| PATENT NO. | : 7,225,465 B2 | Page 1 of 1 |
| APPLICATION NO. | : 09/844272 | |
| DATED | : May 29, 2007 | |
| INVENTOR(S) | : Yves Louis Gabriel Audebert and Olivier Clemot | |

It is certified that error appears in the above-identified patent and that said Letters Patent is hereby corrected as shown below:

Please amend the above-captioned application to read as follows:

On the title page delete
"(73) Assignee: ACTIVCARD, Suresnes Cedex, (FR)" and insert
--(73) Assignee: Matsushita Electric Industrial Co., Ltd., Osaka (JP)--.

Signed and Sealed this

Fourteenth Day of August, 2007

JON W. DUDAS
*Director of the United States Patent and Trademark Office*